(12) United States Patent
Nikolic

(10) Patent No.: US 11,613,402 B2
(45) Date of Patent: Mar. 28, 2023

(54) SELF-FOLDING BOX WITH COMPARTMENTS AND CARRY HANDLE FOR PACKAGING PIZZAS

(71) Applicant: Ivan Nikolic, Belgrade (RS)

(72) Inventor: Ivan Nikolic, Belgrade (RS)

(73) Assignee: Ivan Nikolic, Belgrade (RS)

( * ) Notice: Subject to any disclaimer, the term of this patent is extended or adjusted under 35 U.S.C. 154(b) by 0 days.

(21) Appl. No.: 17/638,503

(22) PCT Filed: Aug. 14, 2020

(86) PCT No.: PCT/RS2020/000011
§ 371 (c)(1),
(2) Date: Feb. 25, 2022

(87) PCT Pub. No.: WO2021/040553
PCT Pub. Date: Mar. 4, 2021

(65) Prior Publication Data
US 2022/0267047 A1    Aug. 25, 2022

(30) Foreign Application Priority Data
Aug. 27, 2019   (RS) .................................. P-2019/1111

(51) Int. Cl.
*B65D 5/48*       (2006.01)
*A47J 47/14*     (2006.01)
(Continued)

(52) U.S. Cl.
CPC ........ *B65D 5/48014* (2013.01); *A47J 47/145* (2013.01); *B65D 5/4266* (2013.01);
(Continued)

(58) Field of Classification Search
CPC . B65D 1/225; B65D 1/22; B65D 5/42; B65D 5/44; B65D 5/48; B65D 5/48014;
(Continued)

(56) References Cited

U.S. PATENT DOCUMENTS

| 1,182,585 A | * | 5/1916 | Richardson | ............... | B65D 5/26 |
| | | | | | 229/149 |
| 3,721,803 A | * | 3/1973 | DiStefano | ................ | H05B 3/00 |
| | | | | | 219/524 |

(Continued)

FOREIGN PATENT DOCUMENTS

| DE | 20016110 U1 | 12/2000 |
| KR | 100856067 B1 | 9/2008 |

*Primary Examiner* — Kareen K Thomas
(74) *Attorney, Agent, or Firm* — The Watson IP Group, PLC; Jovan N. Jovanovic

(57) ABSTRACT

The self-folding pizza packaging box with the compartments and carry handle belongs to the area of transport packaging. The box (1) is made of the folded blank (A), formed by folding and gluing into a flat form of the box (1), and is formed from the upright surfaces in a vertical position. The box (1) is made in the form of a prism with bases (2, 3), parallel lateral panels (4, 4"), while its other two parallel sides are rectangular flaps (5). The box (1) is formed by folding upwards the lateral panels (4, 4') of the rectangular shape along the folding lines (2.1, 2.2, 3.1, 3.2), by straightening the flaps (9.1, 9.2, 9.3, 9.4) which are continued to the lateral panels (4, 4') and by folding upwards the rectangular parts of the flaps (5) along the folding lines (2.3) so that it is brought to a vertical position to the bases (2, 3) of the rhomboid shape. By folding upwards the lateral panels (4, 4') the rhomboid compartments (6, 7) are also straightened, they are pulled in towards the inside of the box (1) in relation to the outer edges of the filling opening. On the flap (5) whose longer side is the folding line (5.1), a cutting line (5.2) is made in which the flap (8) is inserted, made in the middle of the other two parallel sides of the base (3) along the folding line (8.3), thus sealing the box (1) is provided. After putting six slices of pizza, the whole pizza, into the box and closing it, the carry handle (10) is inserted into the box (1) so that the parts (10.3) are inserted between the rectangular (Continued)

parts of the flap (5) and the flaps (9.2, 9.4), the parts (10.2).) rest on the lateral panels (4, 4'), and the part (10.1) is placed diagonally on the surface of the base (3). The application (contain the embodiment of the box (1) which is the folded blank (A1).

9 Claims, 11 Drawing Sheets

(51) Int. Cl.
*B65D 5/42* (2006.01)
*B65D 5/46* (2006.01)
*B65D 81/34* (2006.01)
*B65D 85/36* (2006.01)

(52) U.S. Cl.
CPC ....... *B65D 5/46024* (2013.01); *B65D 81/343* (2013.01); *B65D 85/36* (2013.01); *B65D 2585/366* (2013.01)

(58) Field of Classification Search
CPC B65D 5/4266; B65D 5/46024; B65D 81/343; B65D 85/36; B65D 2585/366; A47J 47/12; A47J 47/145
See application file for complete search history.

(56) References Cited

U.S. PATENT DOCUMENTS

| | | | | |
|---|---|---|---|---|
| 4,237,171 A | * | 12/1980 | Laage | B65D 81/264 |
| | | | | 229/152 |
| 4,265,393 A | * | 5/1981 | Orchard | B65D 5/6652 |
| | | | | 229/160 |
| 4,441,626 A | * | 4/1984 | Hall | B31F 1/2813 |
| | | | | 426/118 |
| 4,476,989 A | * | 10/1984 | Larsen | B65D 81/3816 |
| | | | | 220/4.24 |
| 4,886,179 A | | 12/1989 | Volk | |
| 2014/0252076 A1 | | 9/2014 | Pollock et al. | |

* cited by examiner

SELF-FOLDING BOX WITH COMPARTMENTS AND CARRY HANDLE FOR PACKAGING PIZZAS

FIELD OF TECHNOLOGY

The invention, in a broader sense, belongs to the field of packaging for the transport of materials, e.g. cardboard boxes and more closely, can be defined as the packaging made by folding all the parts that are connected to the central part to shape the body and the parts of the packaging that represent its internal or external equipment, e.g. carry handles.

TECHNICAL PROBLEM

The technical problem solved by the present invention consists in how to structurally solve the transport packaging for packaging pizza slices obtained by cutting a circular pizza into six slices and without the slices sticking to the packaging or another pizza slice; packaging that retains its shape when packing hot slices of pizza; packaging that is quickly, easily formed and filled, and is transported and stored in the flat form which is far more efficiently and affects the low cost of handling costs; packaging which, after forming and filling, takes up a smaller area and which can be carried by the carry handle or placed in the most commonly used bag dimensions; packaging that can be easily taken from the point of sale, which contributes to the expansion of the target group of customers; packaging in which the pizza slices stay warm longer and the influence of moisture is reduced; packaging that is quickly machine-made and where the use of surfaces for placing slices of pizza is maximum; packaging which can be printed on the outer and inner side and that on the inside of the packaging meets all requirements, which relate to the health safety and microbiology; packaging that is transported in a flat form and is formed by simply folding upwards the lateral panels at the place of packaging; packaging which, if necessary, can be disinfected by processes permitted for use with food; packaging that competes with the existing cardboard or PET packaging at the price of the product, and at the same time on the inside it fully satisfies all demands, but on the aesthetic side, it does not reveal the structure of the cartons used for the formation of packaging, while fulfilling the protective, storage, transport, use and environmental function and complied with valid standards and regulations in this area.

STATE OF THE ART

According to the applicant, various construction solutions for pizza transport packaging have been used so far.

It is generally accepted that packaging material is the most important element in creating the packaging design and it practically determinates the choice of technology for its production. Precisely these facts have influenced the strong development of cardboard packaging in addition to polymeric materials which in combination with it enables safer packaging in light cardboard boxes made of special cardboards coated with a polymer layer resistant to temperature, humidity, etc.

In the current practice of facilities that produce pizzas with high productivity, the packaging process is divided into the packaging of pizza slices and packaging of whole pizzas. A slice of pizza is obtained by cutting the pizza by dividing the 360° angle with the center in the middle of the circular pizza into a quarter, sixth or eighth. That is, a slice of pizza covers the area formed by the angle between the radius of the circle obtained by division the angle of 360° with the center in the center of the pizza and the circular arc above that angle that forms the end of the pizza. So that slice of pizza has the approximate shape of an isosceles triangle whit sides that are the radius of the circle and the third line is not a straight one but a circular arc over that angle. The most common angles formed by division are 90°, 60°, and 45°. The diameters of the circles forming the edge of the pizza, which are commonly used are 28 cm, 32 cm, 37 cm, 40 cm, 42 cm, 50 cm, and 55 cm.

The problem with packing pizza slices is that the low price of a slice of pizza is drastically increased by the price of packaging, which satisfies health and microbiological correctness and safety. In terms of economy, a box for one slice of pizza is rarely used and the boxes that are known on the market, have developed in the direction of increasing the base of the box to place more slices of pizza, the whole pizza. Such solutions are not practical because the large area of the base of the box is not practical for carrying and quickly reveals the temperature, so most pizza producers rely on delivery, which further increases handling costs and delivery itself is difficult in locations that are not accessible by cars, bicycles, scooters, and the boxes are not convenient for public transportation. On the other hand, cartons up to 450 g/m2 that can be printed with offset machines often do not have the strength to keep their shape during packaging, and corrugated cardboards require different printing technologies with far poorer print quality, they are much bulkier and therefore the handling costs are many times higher.

A search of the patent and non-patent documentation did not find any documents that solve the given technical problem.

The solution of the same applicant from the patent RS 58588 B1, published on 31 May 2019, is known, with the name "A SELF FOLDING BOX WITH A CARRIER FOR PACKAGING PIZZAS" which shows a box for packing pizza slices comprises of a carrier that is formed by pads, superposed one on another and the box in which the carrier is inserted. This solution enables the packaging of slices of pizza one above the other, and the carrier retains its strength when packaging the slices, and with its strength, it also provides strength to the box in which it is inserted. The dimensions of the pizza slices differ in terms of dividing the round pizza into quarters, sixths or eighths. The disadvantage of the invention is that the carriers must be manually formed during the packaging of the pizza slices, which requires a much longer time compared to the formation of the present invention, the present invention is of simpler construction and has a carrying handle.

SUMMARY OF THE INVENTION

The novelty of the invention is the fact that the box for packing pizza slices is formed by simply folding upwards the lateral panels and takes the form of a box with compartments, where two slices of pizza are placed on each compartment and the lower base of the box. The box is in the shape of a prism whose bases are rhomboid in shape and two compartments are placed inside, it is closed using flaps and locks with the option of inserting a handle for carrying the box. This allows the producers to form a box in a few seconds, the box base is three times smaller than the surface of the pizza, and placing the slices on top of each other allows the pizza to stay warm, and it is easier to carry.

The essence of the invention is that this flat form of the box, which is transported and stored to the pizza manufacturer, is many times smaller in volume than the known boxes made of corrugated cardboard, and thus the handling costs are much lower.

The essence of the invention is also that the compartments for pizza slices are formed by folding upwards the panels in a position ready for filling the box, which reduces the time of formation of the box. The pizza slice compartments are retracted towards the inside of the box regarding the outer edges of the filling opening, which enables the arched sides of pizza slices to rest on top of each other. In this way, the elastic characteristics of the dough are used in terms of stressing on the inner sides of the box, which further strengthens the locking of the box. This invention enables the reduction of the volume of the unformed box 5 to 6 times by using voluminous cartons 0.4-0.7 mm thick which makes transport and storage much cheaper. This invention allows the box to be produced from corrugated cardboard as well as from cardboard thicknesses greater than 0.8 mm and also from cardboard with a protective layer, and it can be disinfected for microbiological protection.

The essence of the invention lies in the fact that by inserting the box into the oven, the pizza can be heated to the temperature predicted by the manufacturer of cardboard or polymer layer. The box can be stored in the refrigerator, and the used box takes up much less space for storage in garbage containers.

The essence of the invention is that in this way it is possible to pack slices of pizza one above the other, and the box retains its strength when packing hot slices.

The essence of the invention is that such a folded blank allows the box with the stated characteristics to be machine-produced, printed, cut along the cutting lines, pressed along the folding lines, and glued to the form in sheets ready for folding upwards and forming the box. In the first phase, the sheet with or without the polymer layer is printed, the printed sheet is cut in the machine with the tool along the outer contour, the cutting lines and the folding lines are also made, then the shaped folded blank is inserted into the gluing machine. The shaped folded blank allows that all the folding lines, around which the glued parts rotate, to be parallel to the direction of movement of the box in the machine, which enables the gluing process, in well-known machines in the printing industry. Firstly, glue is applied in a line on the marked place of the upper part of the shaped folded blank, parallel to the direction of movement through the machine, and the marked part is glued, in one pass. After that, the obtained form is rotated so that the bottom flat part of the glued form is turned upwards, and it returns to gluing. Then the glue is applied in a line to two marked places on the glued form, which are parallel to the direction of movement through the machine. In one pass, first, the glue is applied and the first marked part is being glued and the second marked part is being glued over the first one. The essence of the invention is that the flat shape of the box formed in this way is transported and stored, and can easily be formed by hand folding upwards the lateral panels, it gets the shape of a box with compartments with the option of inserting a handle. The box retains its strength in transport, the slices of pizza retain heat, and the final consumer is enabled to use it elegantly.

BRIEF DESCRIPTION OF THE DRAWINGS

In order to facilitate the understanding of the invention, as well as to show how it can be realized in practice, the applicant refers to the attached draft on which.

THE DESCRIPTION OF THE INVENTION

Figure 17:
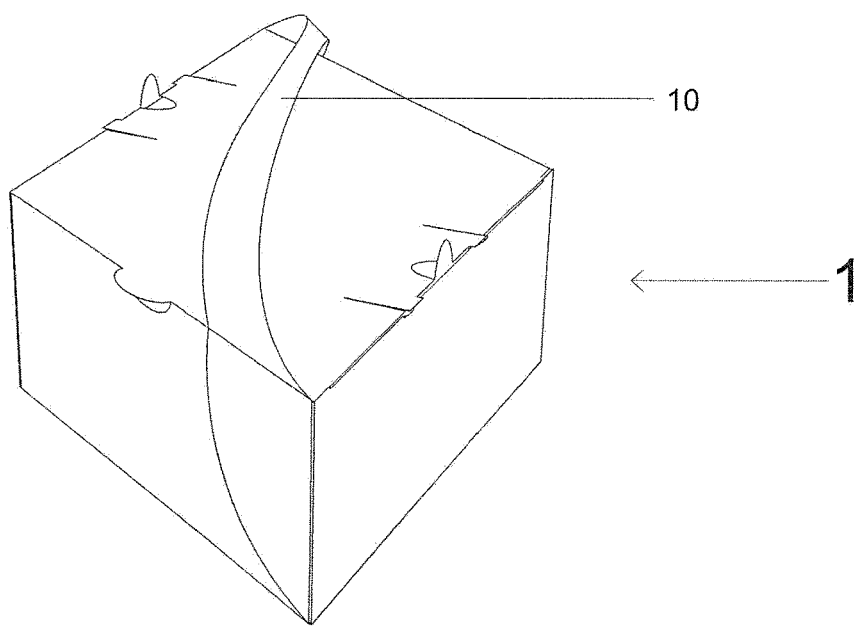
FIG. 17 shows the axonometric appearance of the box with a carry handle.

The present invention refers to the box 1 (FIG. 17) and a carry handle 10 (FIG. 17). The box 1 is made in the form of a prism with bases 2, 3 made in the shape of a rhomboid, and the lateral panels 4, 4', while the rectangular parts of the flap 5 are made on the other two sides for closing the box 1. Inside the box 1, there are two compartments 6, 7 which enable the packing of two slices of pizza on each compartment one above the other, while the box 1 retains its shape and hardness when packing hot slices of pizza. After filling, the box is closed by flaps 5, 9.1, 9.2, 9.3, 9.4 and the carry handle 10 for carrying the box 1 is inserted.

Figure 1:
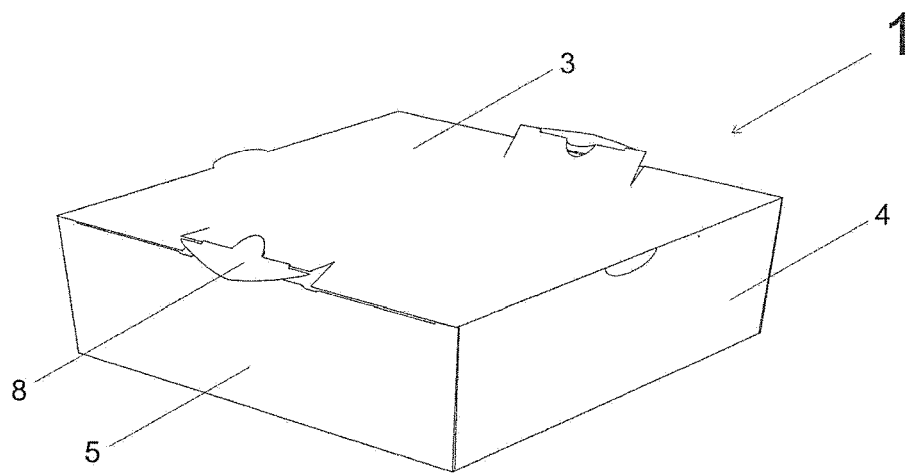
FIG. 1 shows the axonometric appearance of a closed box.
Figure 2:
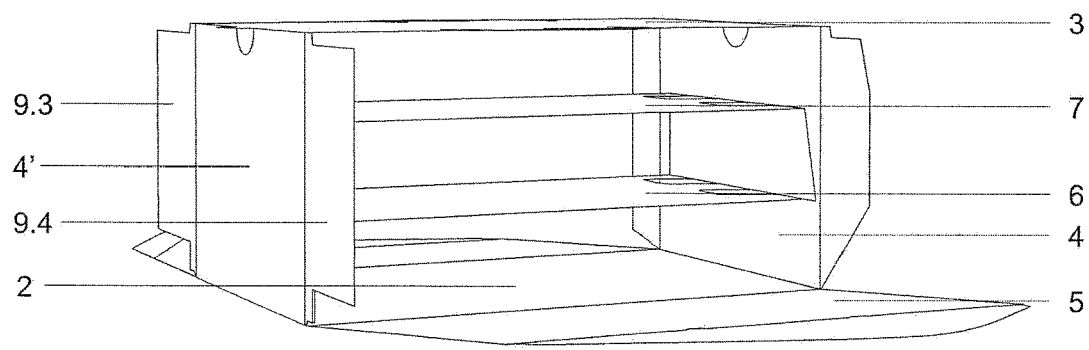
FIG. 2 shows the axonometric appearance of the open box.
Figure 3:
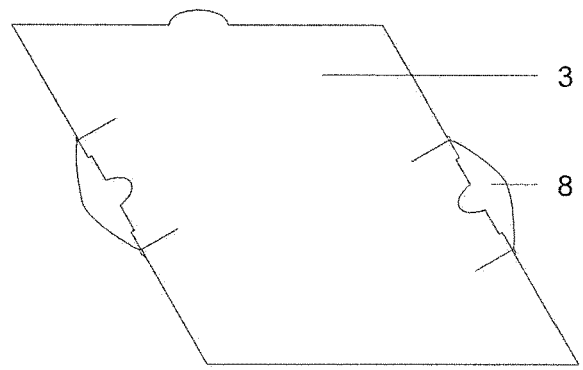
FIG. 3 shows the box, plane view.
Figure 4:
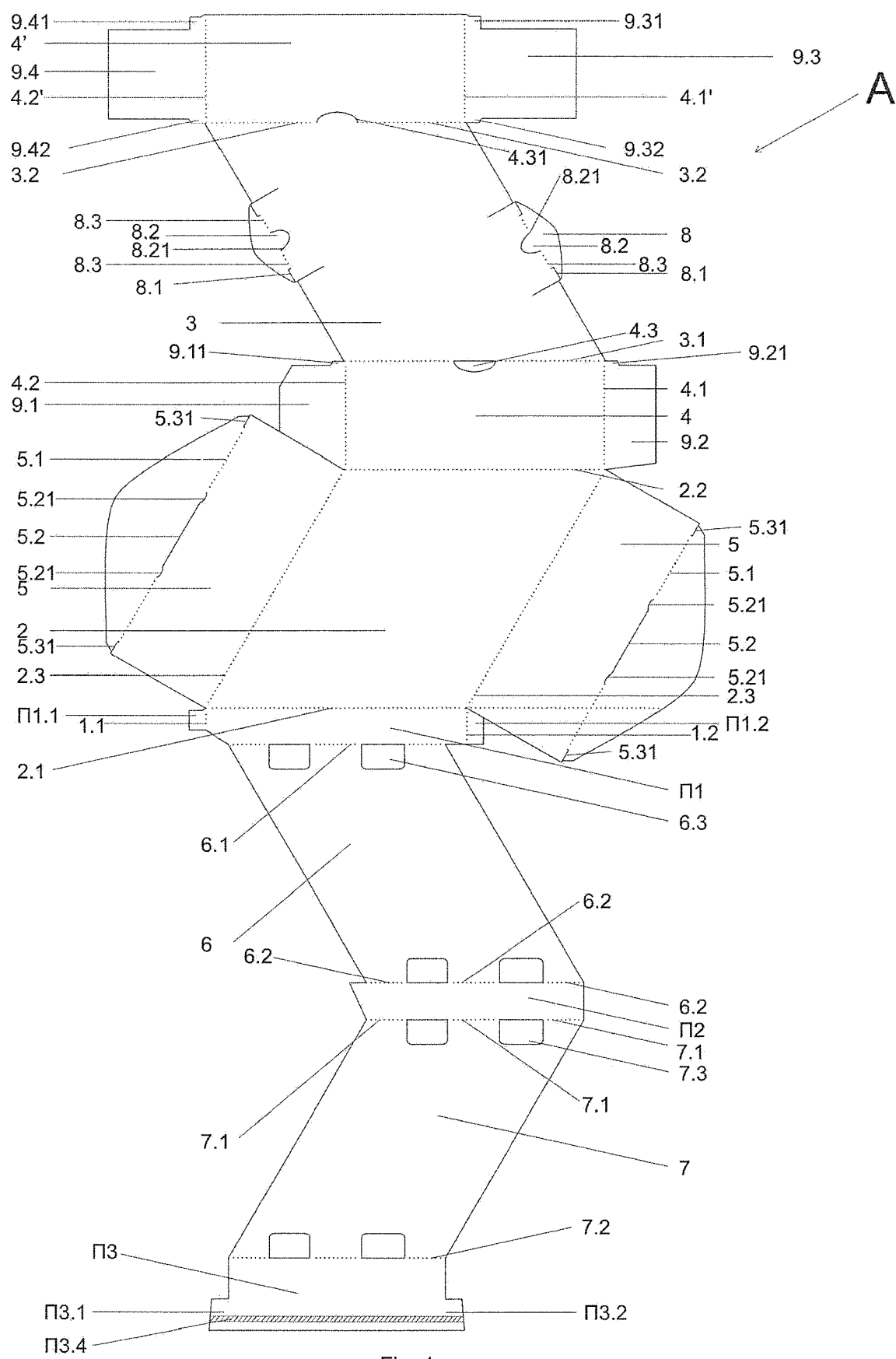
FIG. 4 shows the shaped folded blank of the "A" box, plane view.

Box 1 is formed from a pre-prepared and shaped folded blank A (FIG. 4) which is made of cardboard, corrugated cardboard, or cardboard with a protective polymer layer. Cardboard can be printed on the outside and inside, and coated with a thin polymer layer for greater health safety. The prepared cardboard is placed in the machine for cutting and stamping the folding lines, using a tool with knives (not shown). In the tool there are knives for cutting along the outer contours of the folded blank A, shown by solid lines on the folded blank A, knives for cutting along lines 4.31, 5.2, 5.21, 5.31, 8.1, 8.21, rectangular holes 6.3, 7.3 and semicircular hole 4.3, are shown by solid lines on the folded blank A. With rounded knives, which partially enter the cardboard, the folding lines 1.1, 1.2, 2.1, 2.2, 2.3, 3.1, 3.2, 4.1, 4.2, 4.1', 4.2', 5.1, 6.1, 6.2, 7.1, 7.2, 8.3 are stamped on folded blank A, and they are shown by dotted lines.

The central part of the shaped folded blank A (FIG. 4) represents the surface of the base 2 of a rhomboid shape with sides which are represented by folding lines 2.1, 2.2, 2.3, 2.3, that the folding line 2.1 continues into an irregularly pentagonal surface P1 with the longer side which is the folding line 2.1 and the parallel shorter side is the folding line 6.1, which allows the compartments to be retracted inwards, in relation to the outer edges of the opening. Vertically, at one end of the folding line 2.1 is the folding line 1.2 which continues into the surface of the flap P1.2 while at the other end of the folding line 2.1 is the vertical and shorter folding line 1.1 which continues into the flap surface P1.1. The folding line 6.1 continues into the rhomboid compartment surface 6 while the other side is the folding line 6.2, parallel to the folding line 6.1, and it continues into the trapezoidal-shaped surface P2 with a longer base which is an extended folding line 6.2 and the shorter base is folding line 7.1, parallel and of the same length with the folding line 6.2, and it continues into the surface of the compartment 7 of rhomboid shape. Parallel to the folding line 7.1 is the folding line 7.2 which continues into a rectangular surface P3 with extended surfaces P3.1, P3.2 at the end. On the surface of the compartment 6 along the folding lines 6.1, 6.2 are made two rectangular openings 6.3 for ventilation and on the surface of the compartment 7 along the folding lines 7.1, 7.2 are made two rectangular openings 7.3 for ventilation.

The other side of the base 2 is the folding line 2.2, parallel to the folding line 2.1, which continues into the surface of the lateral panel 4 of the rectangular shape with shorter sides which are the folding line 4.1 which continues into the flap 9.2 and the folding line 4.2 which continues into the flap 9.1. The other side of the rectangle, the folding line 3.1 is parallel to the folding line 2.2, at one end it extends to the side of the flap 9.2 on which the shortened part of 9.21 is made and at the other side, it extends to the side of the flap 9.1 on which the shortened part 9.11 is made. On the surface of the lateral panel 4, a semicircular opening 4.3 for ventilation is made in the middle of the folding line 3.1. The folding line 3.1 continues into the surface of the base 3 of rhomboid in shape, which the other parallel side is the folding line 3.2. In the middle of the other two parallel sides of the base 3 along the folding line 8.3 continues into the flap 8, where at the ends of the folding line 8.3 there are elevated cutting lines 8.1, and in the middle of the folding line 8.3 there is a flap 8.2 along the cutting line 8.21 on the surface of the base 3. The folding line 3.2 continues into the surface of the lateral panel 4' in the shape of a rectangle with a shorter side the folding line 4.1' continued in the flap 9.3 and the other shorter side the folding line 4.2' continued in the flap 9.4. At one end of the flap 9.3 from the folding line 4.1' a shortened flap 9.31 is made and at the other end, a shortened part 9.32 is made, while at one end of the flap 9.4 from the folding line 4.2' a shortened flap 9.41 is made and at the other end a shortened part 9.42 is made. On the surface of the lateral panel 4' in the middle of the folding line 3.2, the cutting line 4.31 for ventilation is made.

The other two parallel sides of the base 2 are the folding lines 2.3 which continue into the rectangular part of the flap 5 which side is the folding line 5.1, parallel to the folding line 2.3, and it continues into the semicircular surface of the flap 5. In the middle of the folding line 5.1, a cutting line 5.2 is made at the ends of which the cutting lines 5.21 are made, while at the ends of the folding line 5.1 elevated 5.31 cutting lines are made.

Figure 5:
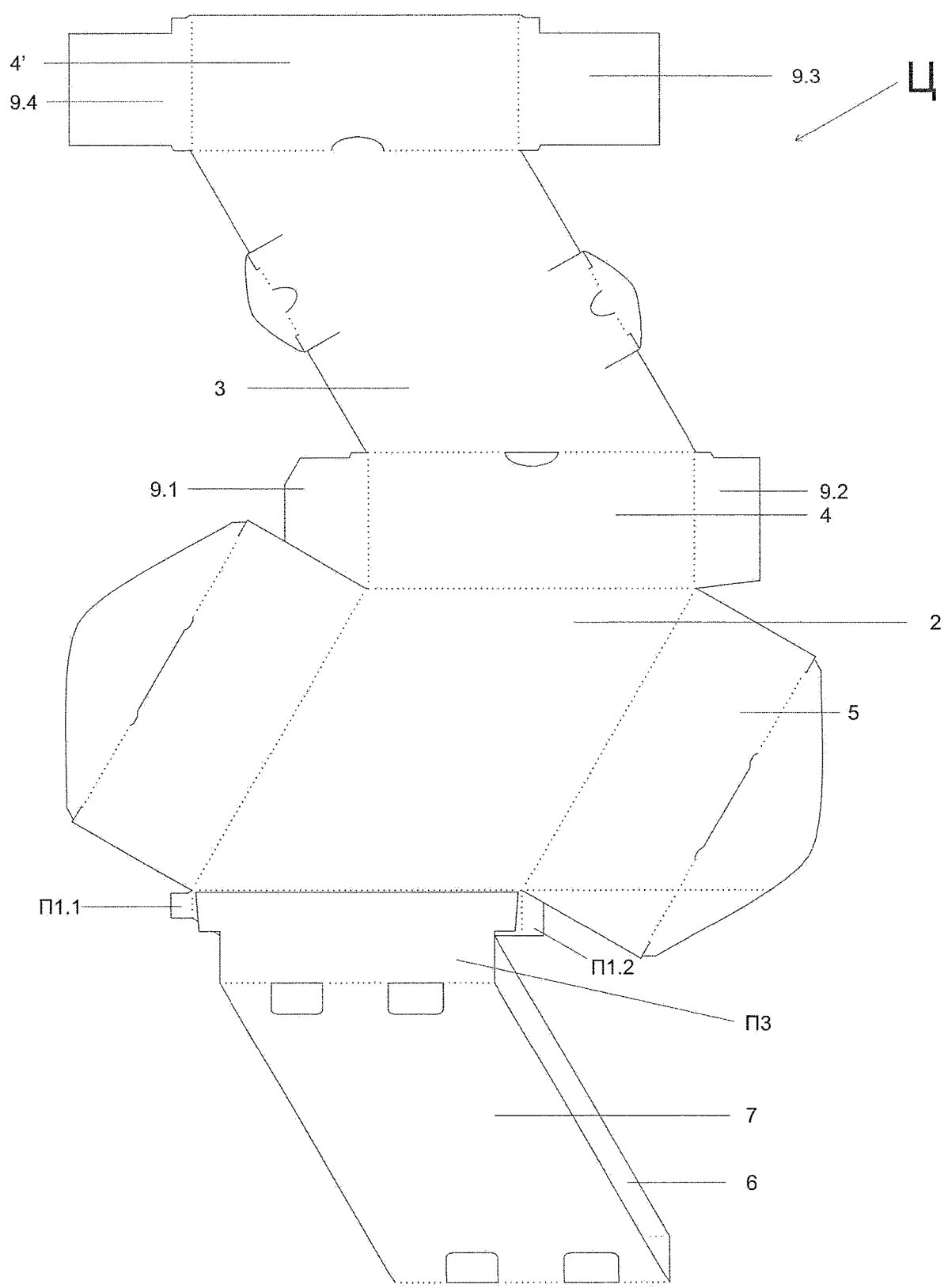
FIG. 5 shows the shaped folded form of the "C" box, plane view.
Figure 6:
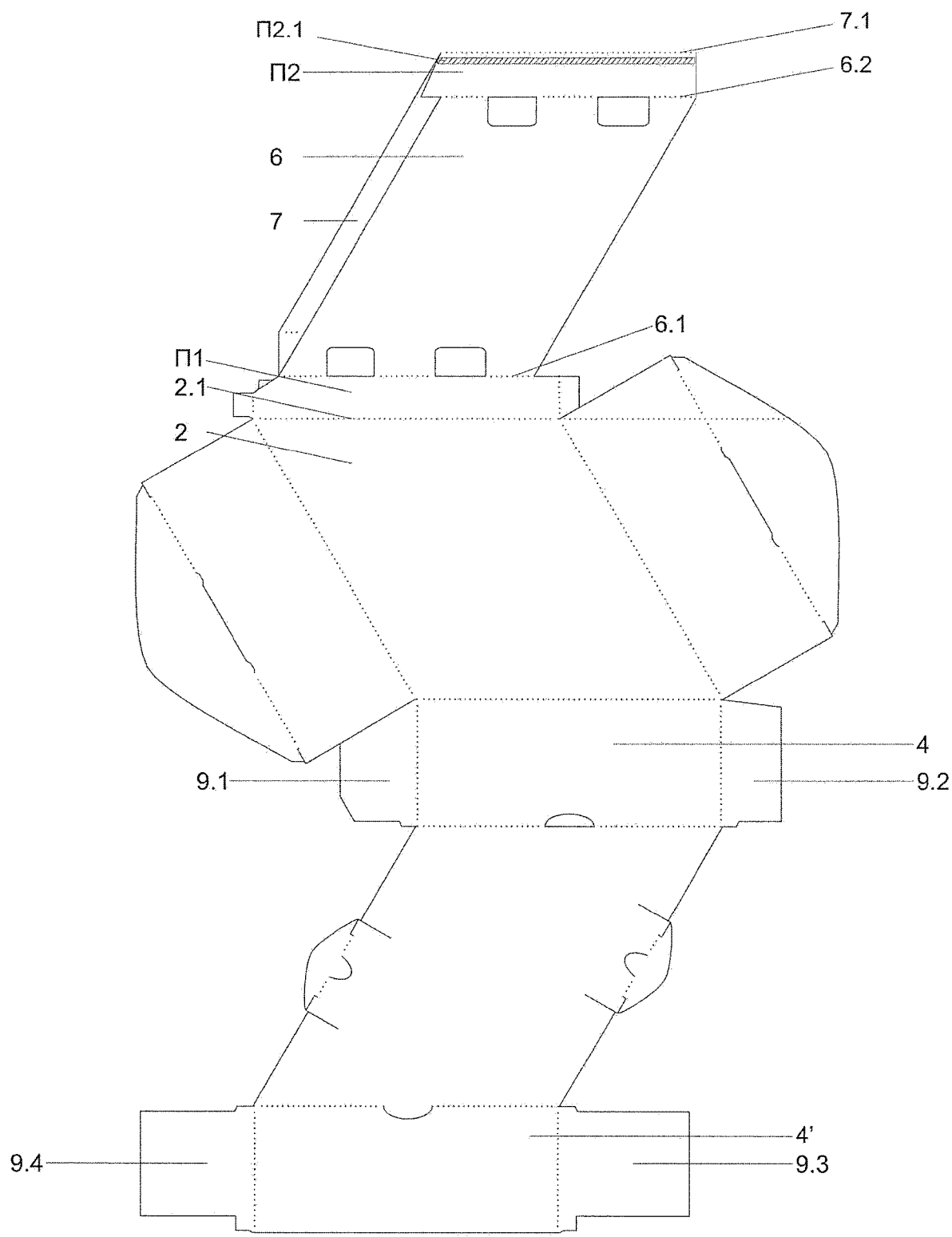
FIG. 6 shows the shaped folded form of the "C" box, turned by 180°, plane view.
Figure 7:
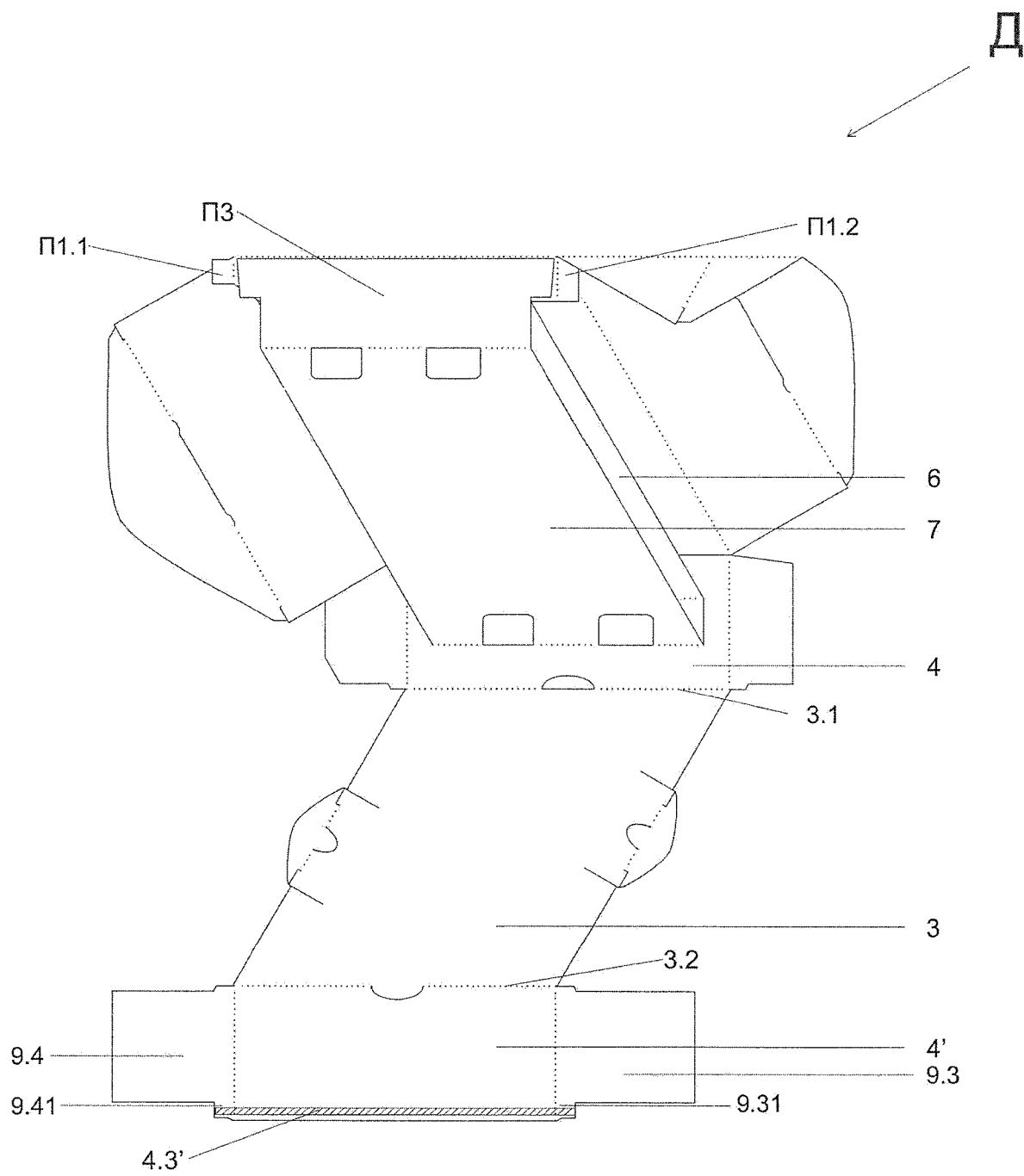
FIG. 7 shows shaped folded form of the "D", plane view.
Figure 8:
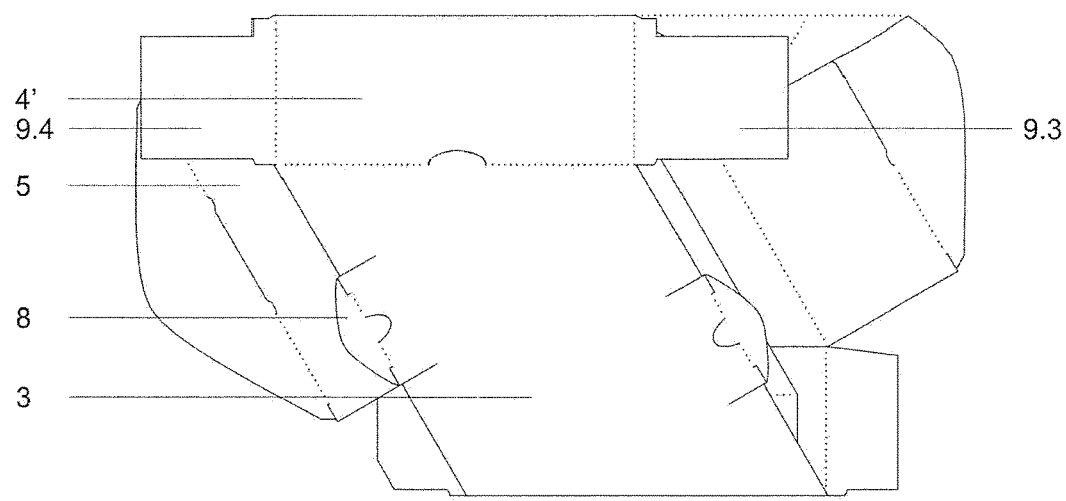
FIG. 8 shows the appearance of the flat form of the box 1, shown in dot folding lines, plane view.
Figure 9:
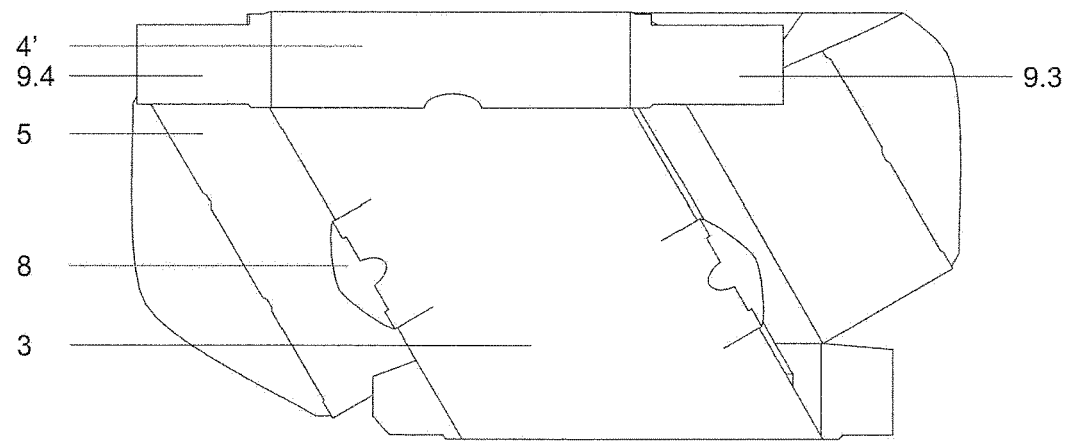
FIG. 9 shows the appearance of the flat form of the box 1, shown in solid lines, plane view.
Figure 10:
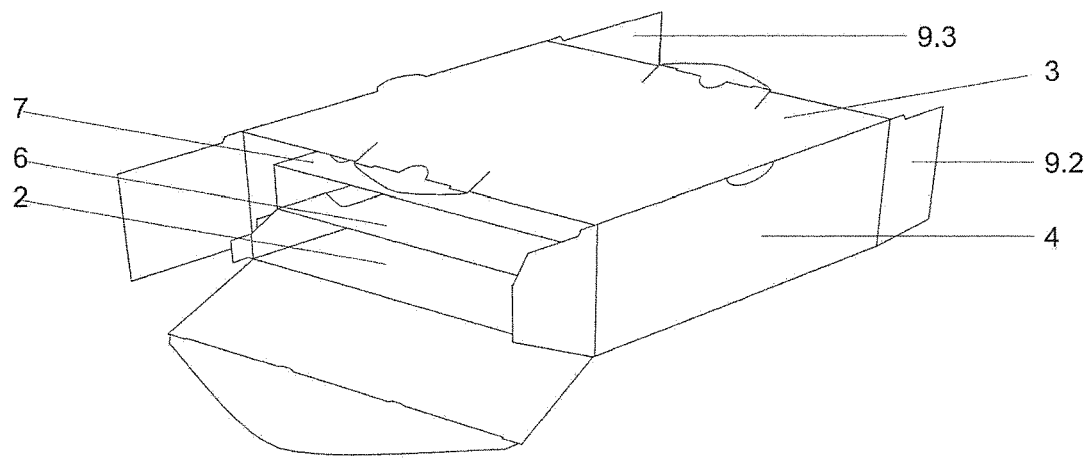
FIG. 10 shows the axonometric appearance of the box, with the lateral panels folded upwards.

The shaped folded blank A (FIG. 4) is placed in the gluing machine, passes in a straight line in one direction and parallel to the direction of movement of the folded blank A, line glue is applied to the surface P3.4 of the surface P3, which is bordered by the folding line 7.2 and cutting lines along the outer contours, shown in solid lines. In the continuation of the movement, around the folding line 7.1, the part of the folded blank A that includes the compartment surface 7 and the surface P3 is bent at an angle of 180° and using the surface P3.4 inseparably connects to the surface P1, between the flaps P1.1 and P1.2 so that the flat surface comprising the compartment surface 7 and the surface P3 rests to the flat surface comprising the surface P1, the compartment surface 6 and the surface P2. This folded form C (FIG. 5) of the folded blank A rotates by 180° so that the lower flat side is turned upwards (FIG. 6). This folded form is inserted into the gluing machine and glue is applied in a line to the surface P2.1 of the surface P2, which is bordered by folding lines 6.2, 7.1, and cutting lines along the outer contours, shown in solid lines. In the continuation of the movement through the machine, around the folding line 2.1, the part of the folded form that includes the surface P1, the surface of the compartment 6, the surface P2, the surface of the compartment 7 and the surface P3 is bent at an angle of 180°, so the surface P2.1 is inseparably connected to the lateral panel 4, the folded form D (FIG. 7). In the direction of the folding line 2.1, the part of the flap 5 which is placed between the flaps P1.2 and 9.2 is bent so that the flat surface comprising P1, the compartment surface 6 and the surface P2 rests on the flat surface of the base 2 and the lateral panel 4, and the flat surface comprising the surface P3 and the compartment surface 7 rests the flat surface comprising the surface P1, the compartment surface 6 and the surface P2, and the bent part of the flap rests to the flap 5. Next, glue is applied in a line on the surface of 4.3' and shortened flaps 9.31, 9.41. In the continuation of the movement through the machine, around the folding line 3.1, the part of the folded form that includes the base 3, the lateral panel 4', the flaps 9.3, 9.4 is bent at an angle of 180°, and over the surface 4.3' inseparably connects to the surface P3, and shortened flaps 9.31, 9.41 are placed on flaps P1.1, P1.2 and the flat form of box 1 is made (FIG. 8, FIG. 9).

Figure 11:
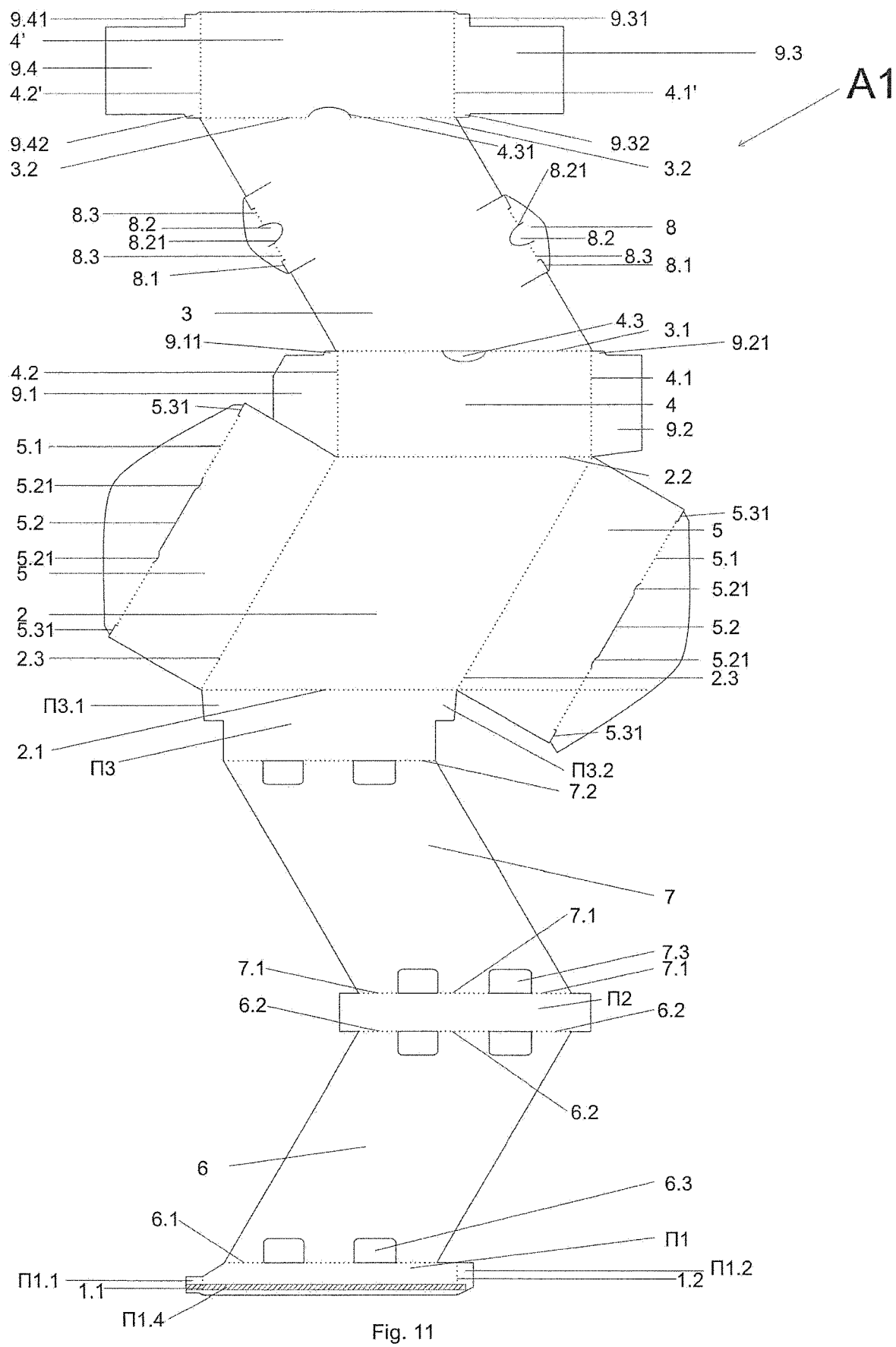
FIG. 11 shows the shaped folded blank of the box "A1", plane view.

In another embodiment, the self-folding box 1 is made from a folded blank A1 (FIG. 11) where the central part of the folded blank A1 represents the surface of the base 2 of a rhomboid shape with sides which are the folding lines 2.1, 2.2, 2.3, 2.3 so that the folding line 2.1 continues into a rectangular surface P3 with extended surfaces P3.1, P3.2 which longer side is the folding line 2.1 and the parallel shorter side is the folding line 7.2, which allows the compartments to be retracted inwards in relation to the outer edges of the opening. The folding line 7.2 continues into a rhomboid compartment surface 7 which other side is a folding line 7.1, parallel to the folding line 7.2, which continues into a rectangular surface P2 which one side is an extended folding line 7.1 and the other parallel side is an extended folding line 6.2 which continues into the surface of the compartment 6 of rhomboid shape. Parallel to the folding line 6.2 is the folding line 6.1 which continues into the surface P1 of an irregular pentagon shape which shorter side is an extended folding line 6.1 and the longer parallel side is equal to the length of the folding line 2.1 so that at one end of the longer parallel side there is a vertical folding line 1.2 which continues into the surface of the flap P1.2 while at the other end there is vertical and shorter folding line 1.1 which continues into the surface of the flap P1.1. On the surface of the compartment 6 along the folding lines 6.1, 6.2 are made two rectangular openings 6.3 for ventilation and on the surface of the compartment 7 along the folding lines 7.1, 7.2 are made two rectangular openings 7.3 for ventilation.

The other side of the base 2 is the folding line 2.2, parallel to the folding line 2.1, which continues into the surface of the lateral panel 4 of the rectangular shape which shorter side is the folding line 4.1 which continues into the flap 9.2 and the folding line 4.2 which continues into the flap 9.1. The other side of the rectangle, the folding line 3.1 is parallel to the folding line 2.2, and at one end it extends to the side of the flap 9.2 on which the shortened part 9.21 is made and at the other end extends to the side of the flap 9.1 on which the shortened part 9.11 is made. On the surface of the lateral panel 4, a semicircular opening 4.3 for ventilation is made in the middle of the folding line 3.1. The folding line 3.1 continues into the surface of the base 3 of the rhomboid shape, which the other parallel side is the folding line 3.2. In the middle of the other two parallel sides of the base 3 along the folding line 8.3 continues into the flap 8, where at the ends of the folding line 8.3 there are elevated cutting lines 8.1, and in the middle of the folding line 8.3 there is a flap 8.2 along the cutting line 8.21 on the surface of the base 3. The folding line 3.2 continues into the surface of the lateral panel 4' in the shape of a rectangle with a shorter side the folding line 4.1' continued in the flap 9.3 and the other shorter side the folding line 4.2' continued in the flap 9.4. At one end of the flap 9.3 from the folding line 4.1' a shortened flap 9.31 is made and at the other end, a shortened part 9.32 is made, while at one end of the flap 9.4 from the folding line 4,2' a shortened flap 9.41 is made and at the other end a shortened part 9.42 is made. On the surface of the lateral panel 4' in the middle of the folding line 3.2, the cutting line 4.31 for ventilation is, made.

The other two parallel sides of the base 2 are the folding lines 2.3 which continue into the rectangular part of the flap 5 which side is the folding line 5.1, parallel to the folding line 2.3 which continues into the semicircular surface of the flap 5. In the middle of the folding line 5.1, a cutting line 5.2 is made at the ends of which the cutting lines 5.21 are made, while at the ends of the folding line 5.1 elevated 5.31 cutting lines are made.

Figure 12:
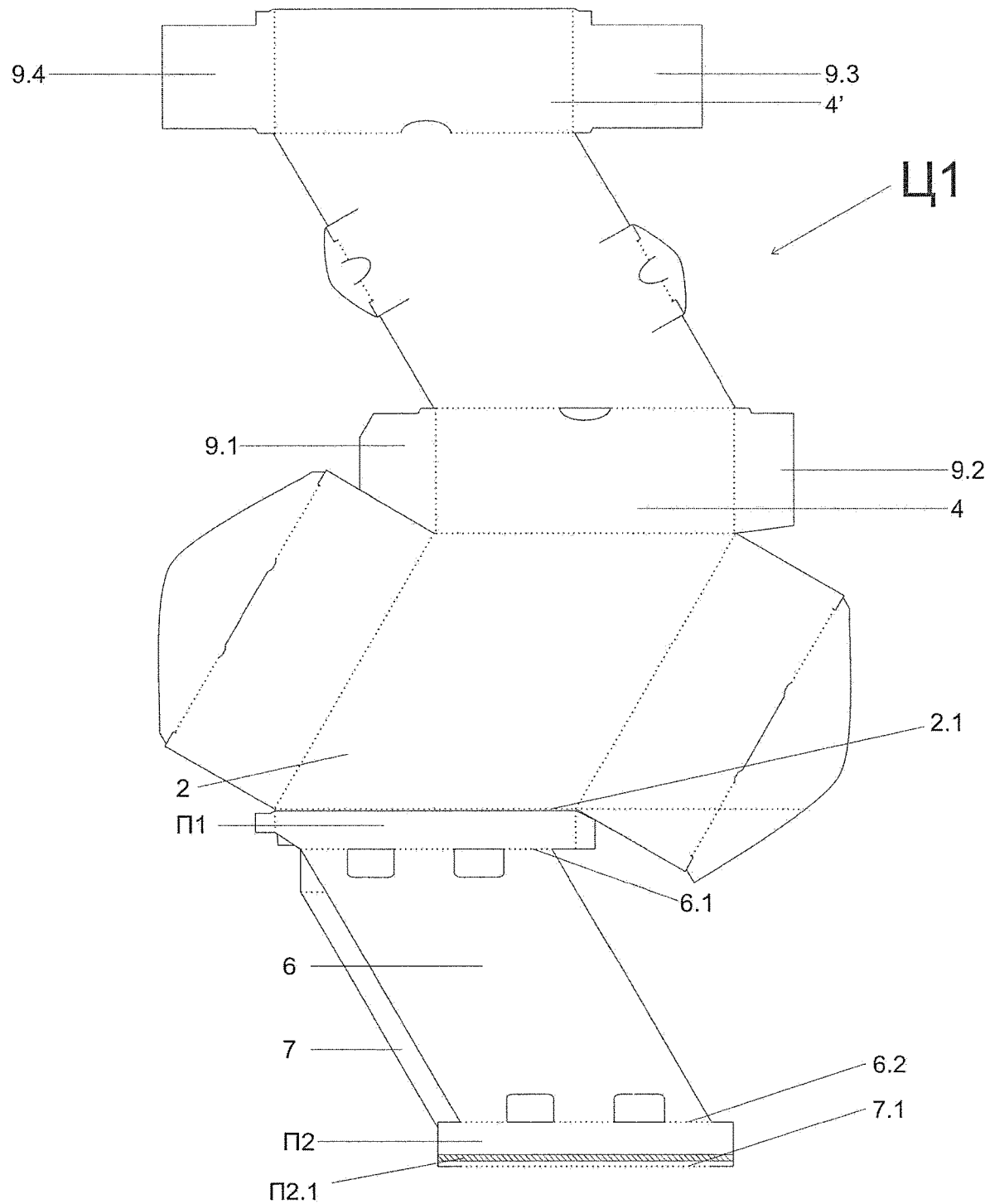
FIG. 12 shows the shaped folded form of the box "C1", plane view.
Figure 13:
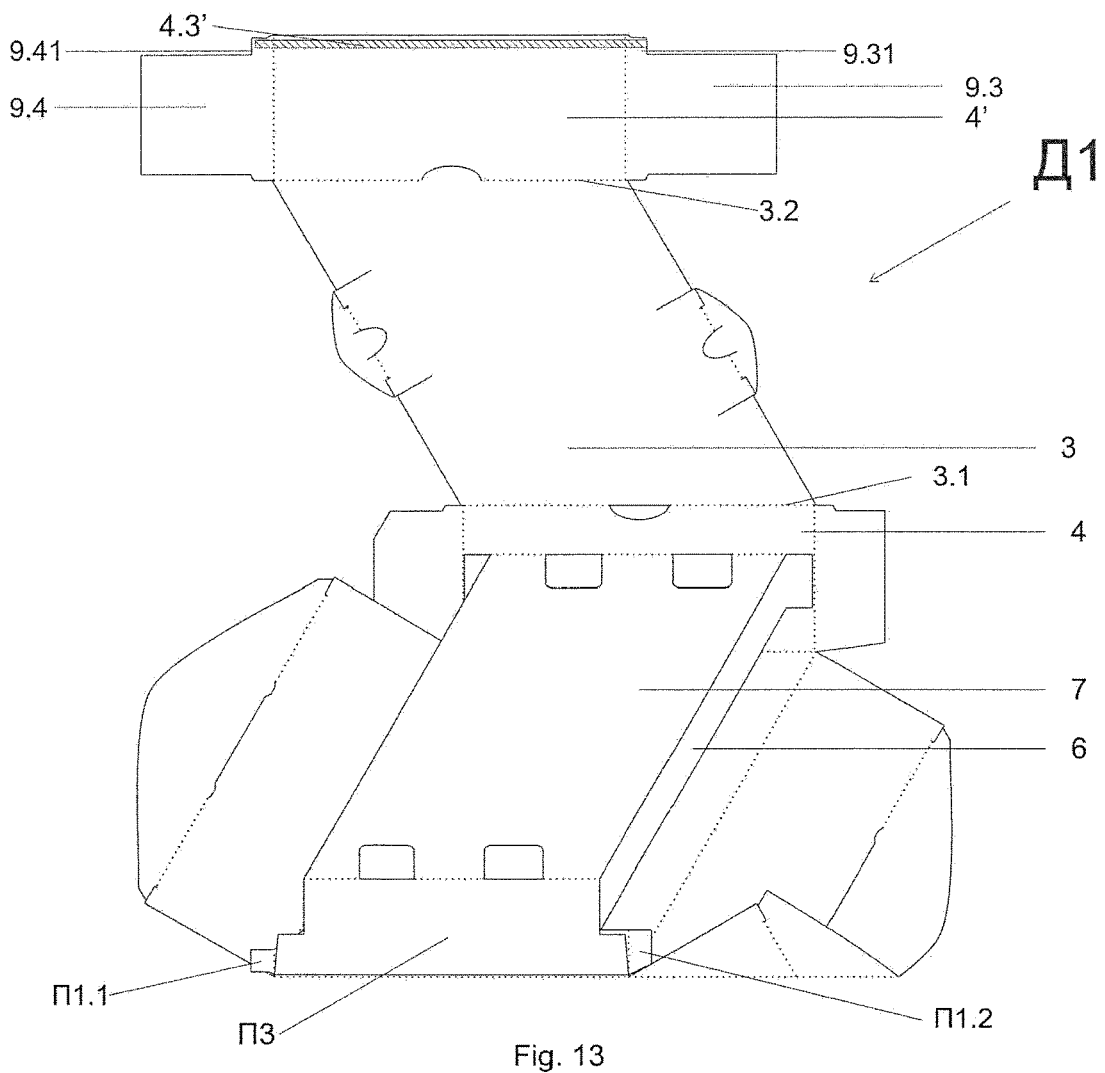
FIG. 13 shows the shaped folded form of the box "D1", plane view.
Figure 14:
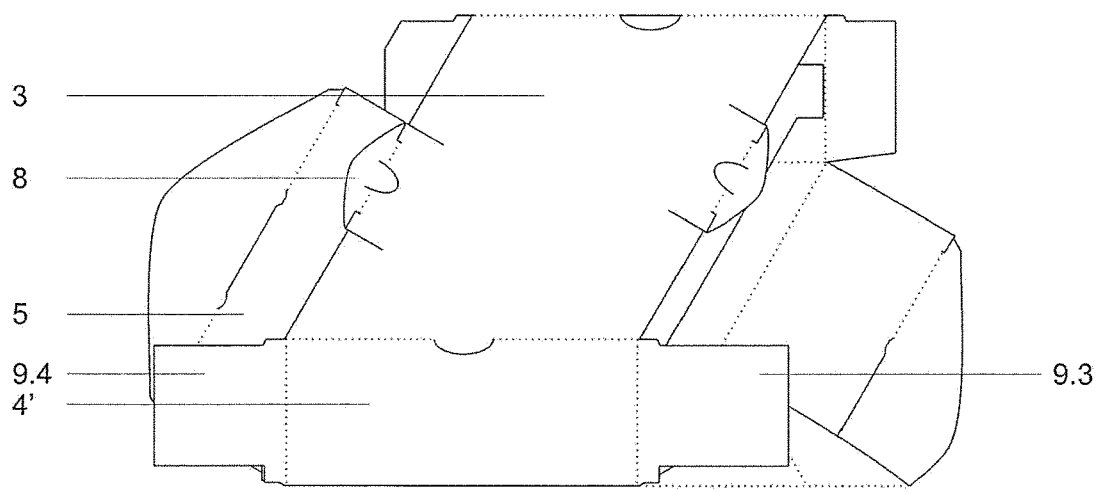
FIG. 14 shows the appearance of the flat form of the box 1, shown in dots folding lines, plane view.
Figure 15:
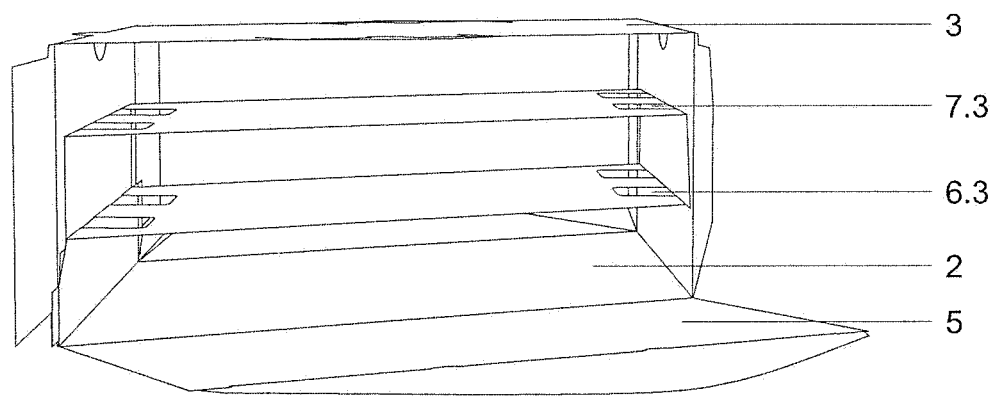
FIG. 15 shows an open box, front view.

The folded blank A1 (FIG. 11) is placed in the gluing machine, passes in a straight line in one direction and parallel to the direction of movement of the folded blank A1, the glue is applied in a line to the surface P1.4 of the surface P1 which is bordered by the folding line 6.1 and cutting lines along the outer contours, shown in solid lines. In the continuation of the movement around the folding line 7.1, the part of the folded form that includes the surface P2, the surface of the compartment 6 and the surface P1 is bent at an angle of 180° and using the surface P1.4 inseparably connects to the surface P3, between the surfaces P3.1 and P3.2 so that the flat surface comprising the surface P1, the surface of the compartment 6 and the surface P2 rests the flat surface comprising the surface P3 and the compartment surface 7, the folded form C1 (FIG. 12). On the folded form C1 (FIG. 12) glue is applied in a line to the surface P2.1 of the surface P2, which is bordered by the folding lines 6.2, 7.1, and the cutting lines along the outer contours, shown in solid lines. In the continuation of the movement through the machine, around the folding line 2.1, the part of the folded form that includes the surface P3, the surface of the compartment 7, the surface P2, the surface of the compartment 6 and the surface P1 is bent at an angle of 180°, and using, the surface P2.1 inseparably connects to the lateral panel 4, D1 (FIG. 13). In the direction of the folding line 2.1, the part of the flap 5 which is placed between the surface P3.2 and the flap 9.2 is bent so that the flat surface comprising P1, the compartment surface 6 and the surface P2 rests on the flat surface of the base 2 and the lateral panel 4, and the flat surface comprising the surface P3 and the compartment surface 7 rests on the flat surface comprising the surface P1, the compartment surface 6 and the surface P2, and the bent part of the flap rests on the flap 5. Next, glue is applied in a line on the surface of 4.3' and shortened flaps 9.31, 9.41. In the continuation of the movement around the folding line 3.1 the part of the folded form that includes the base 3, the lateral panel 4', flaps 9.3, 9.4 is bent at an angle of 180° and using the surface 4.3' inseparably connects to the surface P3, also shortened flaps 9.31, 9.41 are placed on flaps P1.1, P1.2 so the flat form of box 1 is made (FIG. 14).

Figure 16:
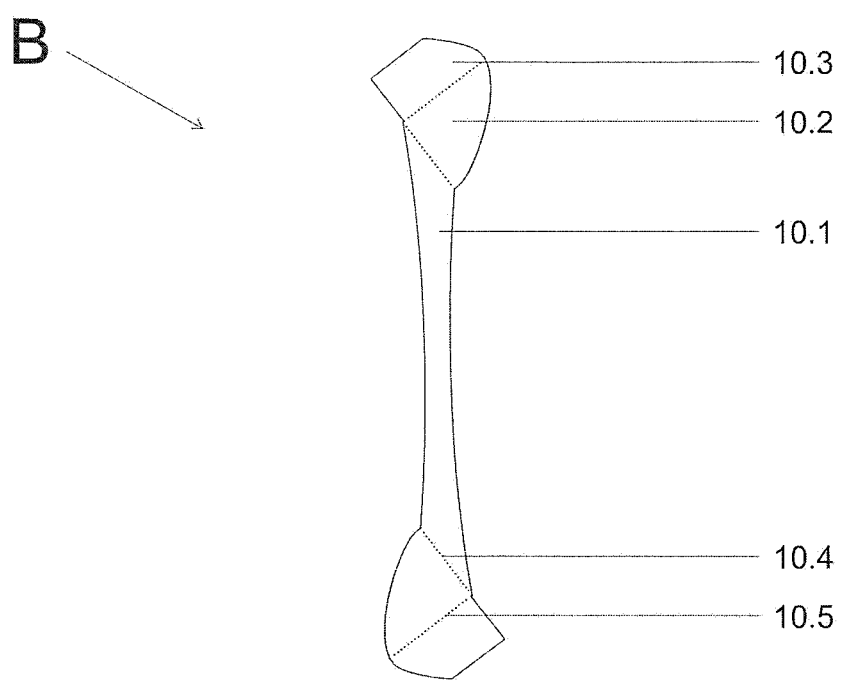
FIG. 16 shows the shaped folded blank "V" of the carry handle.
Figure 19:
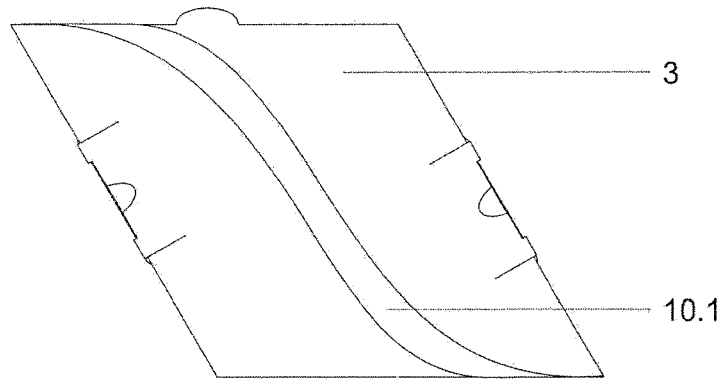
FIG. 19 shows the appearance of the box with the carry handle, plane view.
Figure 18:
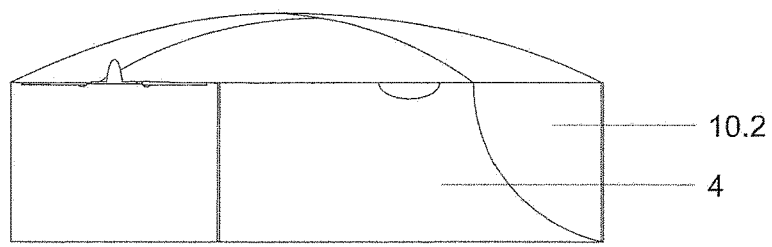
FIG. 18 shows the appearance of the box with the carry handle, side view.

The carry handle 10 (FIG. 17) is formed from a pre-prepared and folded blank V (FIG. 16) which is made of cardboard with or without a polymer layer and is placed in a machine in which a tool with knives is placed (not shown). In the tool, there are knives for cutting along the outer contours of the carry handle 10 and rounded knives which partially enter the cardboard and perform the planned folding lines 10.4, 10.5 on the folded blank B.

The central part of the folded blank V (FIG. 16) represents an elongated surface 10.1 with longer concave sides, while on both shorter sides of the surface 10.1 folding lines 10.4 continue into surfaces 10.2 bordered by folding lines 10.4, 10.5, and arc above them, and folding lines 10.5 continue into the surface of 10.3 of the rectangular trapezoid shape whose one arm is bent.

Box 1 is formed from the flat form of box 1 (FIG. 8, FIG. 9), by folding upwards the lateral panels 4, 4' into a vertical position relative to base 2, and they obtain the shape of a prism with bases 2, 3 in the shape of the rhomboid.

By folding upwards the lateral panels 4, 4', the surface P1 is brought into a vertical position along the folding line 2.1, by folding along the folding line 6.1 a compartment 6 is formed, while along the folding line 6.2 the surface P2 is brought into the vertical position, and by folding along the folding line 7.1 a compartment 7 is formed.

In another embodiment, the box 1 is formed from the flat form of the box 1 (FIG. 14), by folding upwards the lateral panels 4, 4' which brought to the vertical position the surfaces P3 along the folding line 2.1, and by folding along the folding line 7.2 the compartment 7 is formed, while along the folding line 7.1 the surface P2 is brought into the vertical position, and by folding along the folding line 6.2 the compartment 6 is formed.

The flaps 9.3, 9.4 are bent along the folding lines 4.1', 4.2' towards the opening of the box 1, and are overlapped by the rectangular surface of the flap 5, folded along the folding line 2.3, while the semicircular surface of the flap 5 is folded along the folding line 5.1, and is pulled in below the surface of the base 3. By inserting the flap 8 into line 5.2 of the cut, box 1 is closed, i.e. the extraction of the semicircular surface of the flap 5 is prevented. The elements made by the cutting along the cutting line 5.21 and the elevated cutting line 8.1 additionally prevent the extraction of the flap 8 from the cutting line 5.2. Using the shortened parts 9.11, 9.21, 9.32, 9.42 and the elevated parts along the cutting lines 5.31, the extraction of the semicircular surface of the flap 5, pulled in below the surface of the base 3, is additionally ensured.

In the box 1 formed in this way, between the rectangular surface of the flap 5 and the bent flap 9.4, part 10.3 of the carry handle 10 is inserted on one side, while part 10.2 rests on the outer surface of the lateral panel 4', on the other side of the carry handle 10 part 10.3 is inserted between the rectangular surface of the flap 5 and the folded flap 9.2 and part 10.2 rests on the outer surface of the lateral panel 4. Part 10.1 of the carry handle 10 is placed diagonally over the outer surface of the base 3.

Rectangular openings 6.3, 7.3 made in pairs on the compartments 6, 7, and a semicircular opening 4.3 and an opening along the cutting line 4.31, made on the lateral panels 4, 4' serve for ventilation of the pizza so that it does not steam.

The box 1 formed in this way can hold six slices of pizza, the whole pizza, two slices on compartments 6, 7, and two slices on the base 2.

The invention claimed is:

1. A self-folding box for packing pizzas with compartments, which is formed from a folded blank, comprising a prism shape with a pair of rhomboid bases each having opposing acute angles and opposing obtuse angles, two parallel rectangular lateral panels forming a first pair of opposing sides, with two rectangular flaps forming a second pair of opposing sides, defining a cavity, wherein the two parallel rectangular lateral panels extend between opposing parallel folding lines at each rhomboid base, each of the two parallel rectangular lateral panels having opposing upright flaps extending therefrom, and two rectangular flaps extending from opposing folding lines from a first of the pair of rhomboid bases, wherein the two parallel rectangular lateral panels, the opposing upright flaps and the rectangular flaps are perpendicular to the pair of rhomboid bases, with a shelving portion formed by a pair of rhomboid surfaces, a first of the pair of rhomboid surfaces coupled to a first one of the pair of rhomboid bases through a first joining surface defining a pair of parallel fold lines, a second of the pair of rhomboid surfaces coupled to the first one of the pair of rhomboid bases through a second joining surface defining a second pair of parallel fold lines, with a third joining surface extending from the second one of the pair of rhomboid bases opposite the second joining surface with the first joining surface being attached to a first of the two parallel rectangular lateral panels, with the second joining surface being attached to a second of the two parallel rectangular lateral panels and the third joining surface being attached to one of the first of the two parallel rectangular lateral panels and the first joining surface, thereby forming three compartments within the cavity, wherein the two rectangular flaps each include a semicircular portion extending therefrom opposite the first of the pair rhomboid base at opposing flap fold lines, each flap fold line having a cut portion therealong, and the second of the pair of rhomboid surfaces having opposing flaps extending therefrom each extendable through a respective one of the cut portions.

2. The box, according to claim 1, wherein the first joining surface comprises an irregular pentagon surface, the second joining surface comprises a rectangular trapezoid surface and the third joining surface comprises a rectangle having opposing extended surfaces at a distal ends thereof.

3. The box, according to claim 1, wherein the first joining surface and the third joining surface are coupled to a first one of the two parallel rectangular lateral panels through glue, and the second joining surface is coupled to the second one of the two parallel rectangular lateral panels through glue.

4. The box, according to claim 1, wherein the opposing upright flaps meet a respective one of the pair of rectangular lateral panels at a fold line.

5. The box, according to claim 1, wherein the cut portion of each of the flap fold lines is positioned about a midpoint of the respective one of the flap fold lines.

6. The box, according to claim 1, wherein the opposing flaps of the pair of rhomboid surfaces are defined by opposing folding lines.

7. The box according to claim 1, wherein the third joining panel is coupled to the first joining panel which is coupled to the first of the two parallel rectangular lateral panels.

8. The box, according to claim 7, wherein the first joining surface comprises a rectangle having opposing extended surfaces at a distal end thereof, the second joining surface comprise a rectangular surface and the third joining surface comprises an irregular pentagon surface.

9. The box, according to claim 1, further comprising a carry handle, the carry handle including a first insert portion insertable between a first of the upright flaps and a first of the rectangular flaps, and a second insert portion insertable between a second of the upright flaps and a second of the rectangular flaps, with an elongated portion extending therebetween and diagonally across the second of the pair of rhomboid bases.

* * * * *